Patented July 25, 1933

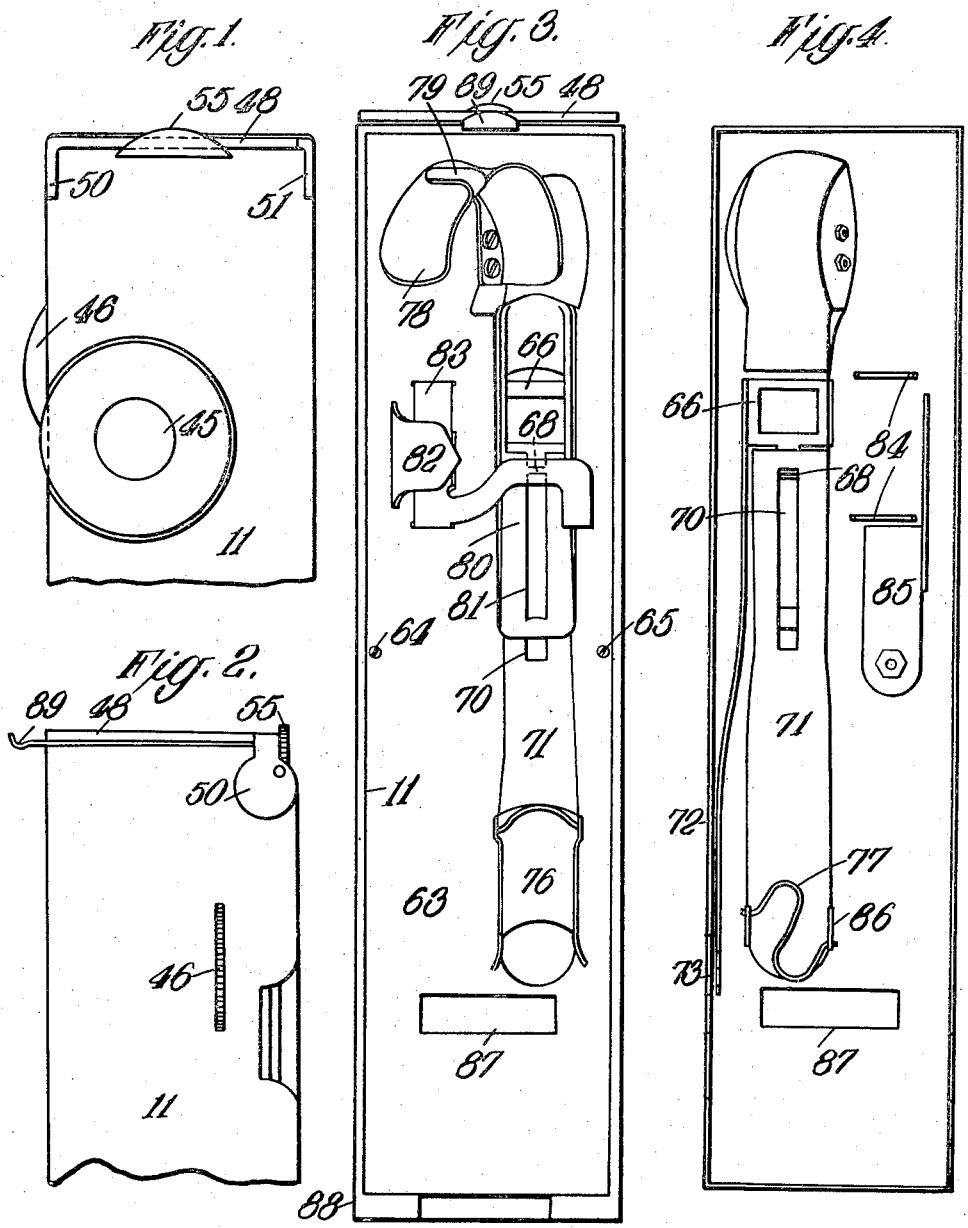

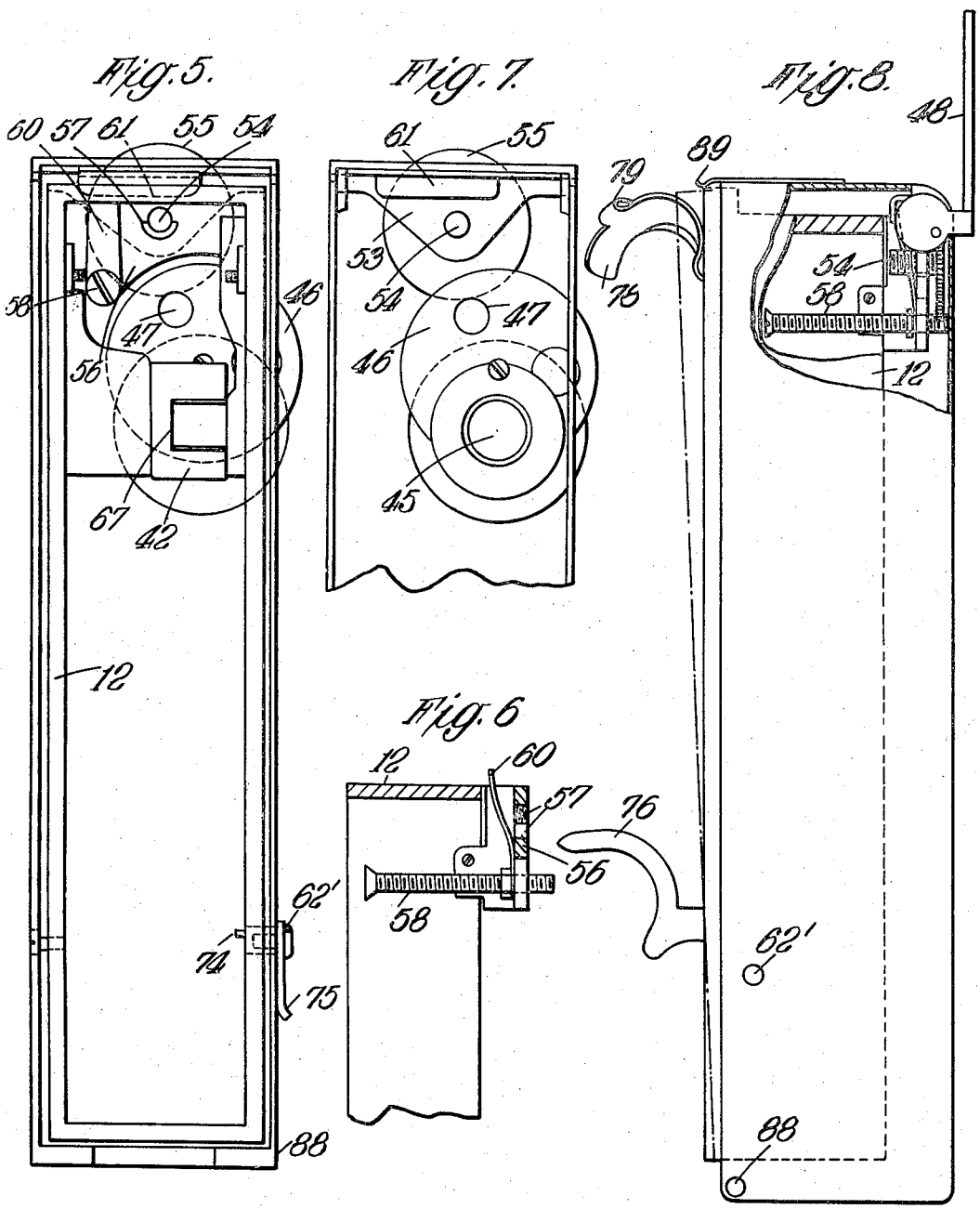

1,919,513

UNITED STATES PATENT OFFICE

CHARLES EDWARD HILLERY-COLLINGS, OF LONDON, ENGLAND, ASSIGNOR, BY MESNE ASSIGNMENTS, TO CAMERA-PROJECTORS LIMITED, OF LONDON, ENGLAND, A BRITISH COMPANY

FOCUSING MEANS FOR PHOTOGRAPHIC CAMERAS AND PROJECTORS

Application filed February 25, 1932, Serial No. 595,104, and in Great Britain March 16, 1931.

This invention relates to focusing means for photographic cameras and projectors, and is especially useful in connection with cinematographic cameras convertible to projectors. Its chief object is to enable the focus which may have been varied for the purpose of projection to be instantly adjusted to a fixed focal length by the operation of a single external member.

According to the invention means are provided to adjust the film gate relatively to a fixed lens to vary the focal length, and separate means are provided to return the film gate to the position of minimum focal length for example upon the operation of an external member, which may be the front frame of the view finder. The outer casing of the instrument containing a fixed lens may be combined with an inner casing containing the film gate and pivotally connected with the outer casing at a point remote from the film gate, the distance between the film gate and the front of the camera containing the lens being adjustable by means of an external member, for example the head of a screw. The inner casing may be returned to the position of fixed focus by a spring controlled by another external member, which may be a hinged view finder adapted to be laid flat on top of the outer casing, in which position the screw is engaged, the said view finder when erected for use causing by means of an eccentric action of its hinges the disengagement of the screw, when the spring returns the inner casing to the position of fixed focus.

In order that the said invention may be clearly understood and readily carried into effect, an exemplification of the same will now be described more fully with reference to the accompanying drawings, in which:—

Figure 1 is a front elevation of a portion of the camera with the view finder laid down.

Figure 2 is a side elevation taken from the left side viewing Figure 1.

Figure 3 is a rear elevation of the camera, the film spool receptacles and their cover being assumed to be removed to show a partition containing the film gate.

Figure 4 is an elevation of the inner side of the said partition.

Figure 5 represents in rear elevation the adjusting mechanism in its operative position, the partition being removed.

Figure 6 is a detail representing in central vertical section the parts of the adjusting mechanism which are carried in the inner casing.

Figure 7 is a detail representing in rear elevation the parts of the adjusting mechanism which are carried in the outer casing.

Figure 8 is a side elevation corresponding with that in Figure 2, but with the view finder erected and the inner and outer casings broken away to show the focusing means in the inoperative position.

In the drawings 11 indicates the outer casing, 12 the innner casing, 45 the fixed lens, with which is associated in the usual way a rotatable disc 46 having therein perforations 47 of different sizes in order to regulate the effective lens aperture, and 48 a view finder of a known type. This view finder is provided with lugs 50, 51, adapted for angular movement in recesses at the corners of the outer casing 11. Eccentrically located in these lugs are the corners of a plate 53, in which is rotatable a screw 54 having a milled head or disc 55, a portion of the periphery of which milled head projects through a slot in the top of the outer casing when the view finder is collapsed as seen in Figures 1 and 2, but when the view finder is erected the plate 53 is caused by reason of its eccentric connection with the lugs of the view finder to descend, that is, to recede from the top of the outer casing sufficiently to draw the milled head down flush with the top of the casing. On the inner casing 12 is secured a plate 56 (see especially Figure 6) in which is a hole 57 having a short internal screw thread formed in its upper portion, its lower portion being of larger radius. A stop screw 58 passes through this plate 56, and abuts against the interior of the outer casing 11, whereby the fixed focal limit can be regulated, that is, the extent of movement of the film gate towards the lens when returning to the position of fixed focus can be limited by the screw 58. The said stop screw also serves to secure on the plate 56 a spring 60 which engages under a bead or flange 61 on the plate 53 and constantly tends to press the plate 56, and therefore the inner casing 12, towards the position of fixed focus. The inner casing is pivoted on screws 62¹ secured in the outer casing. It will be seen that when the view finder 48 is laid down, and the plate 53 is therefore drawn by the eccentric action of the lugs 50, 51 towards the top of the outer casing, the screw 54 operatively engages the threaded portion of the hole 57, and by rotation of the milled head 55 of the said screw the inner casing 12 can be slightly rocked about its pivots 62¹, to adjust the focal length, as indicated in dotted lines in Figure 8. This adjustment can be reversed by reversing the rotation of the milled head, but when the view finder 48 is erected, its lugs 50, 51 acting on the plate 53 lower the said plate so that the screw 54 is disengaged from the threaded part of the hole 57 and passes through the wider part of the said hole. Rotation of the screw would then be difficult to accomplish owing to the sinking of the milled head 55 into its slot in the outer casing, but in any case such rotation would then be ineffective, and the spring 60 confined between the bead 61 and the plate 56 returns the inner casing to the position of fixed focus as seen in full lines in Figure 8.

The partition 63 may be secured to the inner casing 12 by screws 64, 65. The film gate 66 is vertically adjustable in the said partition, and is arranged to come opposite an opening 67 in a bracket 42 on the inner casing, the said bracket also serving to guide the shutter (not shown). The film gate has a hooked central lug 68 entering a slot 70 in a grooved or depressed portion 71 of the partition 63, and has also a tail-piece 72 terminating in a notched end 73 engaging an eccentric pin 74 which is secured by the screw 62¹, on the outer side of which is a finger piece 75. By an angular movement of the eccentric pin effected by turning the said finger piece a longitudinal movement of adjustment can be imparted to the tail-piece 72 and film gate 66.

The film is supplied from any suitable spool box (not shown) or other receptacle, and is passed under the hook 79 on the concave outer surface of a fixed curved guide 78, then behind the film gate 66, against which it is held by the spring gate 80 hinged to the partition by two pins or lugs 84 passing through holes in the partition. A hook 82 on the partition has a spring base 85 and presses on the base 83 of the spring gate when the latter is lifted or turned outwardly to permit the insertion of the film, and presses on an upturned flange on the said base when the spring gate is in the operative position shown in Figure 3. From the spring gate the film passes over the pivoted presser block 76, which is of approximately semicircular cross section when designed for use with a narrow film, and is normally pressed outwardly from the partition by a spring 77 (Figure 4) engaging its hinges 86. When the film is inserted and the rear portion of the camera closed on the partition, the presser block 76 is rocked towards the partition and a loop of film is thereby formed below the spring gate. The spring gate has in its upper end an opening rather larger than the opening of the film gate 66, and in its lower portion a slot 81 corresponding with the slot 70 to give passage to the claw (not shown) which effects the intermittent movements of the film. Such a claw may be actuated by mechanism operating through a hole 87 in the partition 63. The back part of the casing (not shown) of the instrument, which contains the spool box, may be hinged to the bottom of the part shown by a pin passing through hinge jaws 88, and a spring clip 89 at the top of the casing is provided to hold the back and front parts together while in operation.

What I claim and desire to secure by Letters Patent of the United States is:—

1. In a photographic camera convertible for use as a projector, an outer casing, a lens fixed in said outer casing, an inner casing pivotally connected with said outer casing, a film gate carried in said inner casing at a point remote from the pivotal connection, a manually operable external member movable in said outer casing and adapted to engage said inner casing to rock said inner casing about its pivots to vary the focal length, a second manually operable external member movable in said outer casing and adapted to disengage said first named external member from said inner casing, and resilient means to return said inner casing to the position of minimum focal length upon the occurrence of such disengagement.

2. In a photographic camera convertible for use as a projector, an outer casing, a lens fixed in said outer casing, an inner casing pivotally connected with said outer casing, a film gate carried in said inner casing, an adjustable stop carried by said inner casing and adapted to engage said outer casing to limit the relative movement in one direction between said casings, a manually operable external member movable in said outer casing and adapted to engage said inner casing to rock said inner casing about its pivots to vary the focal length a second manually operable external member movable in said outer casing and adapted to disengage said first named external member from said inner casing and resilient means to return said inner casing to the position limited by said adjustable stop upon the occurrence of such disengagement.

3. In a photographic camera convertible for use as a projector, an outer casing, a lens fixed in said outer casing, an inner casing pivotally connected with said outer casing, a film gate carried in said inner casing at a point remote from the pivotal connection, a view finder hinged to said outer casing by eccentric lugs, a plate reciprocable by the action of said lugs, a screw rotatable in said plate, a crossbar on said inner casing having therein an aperture screw threaded in its upper part to engage said screw in the upper position of said screw to rock said inner casing on its pivots, but disengaged therefrom when said screw is in its lower position, and resilient means to return said crossbar and inner casing to the position of minimum focal length on the occurrence of such disengagement.

4. In a photographic camera convertible for use as a projector, the combination of an outer casing, a lens fixed in said outer casing, an inner casing pivotally connected with said outer casing, a film gate carried in said inner casing at a point remote from the pivotal connection, a manually operable external member movable in said outer casing and adapted to engage said inner casing to rock said inner casing about its pivotal axis in order to vary the focal length of the camera, a second manually operable external member movable in said outer casing and adapted to disengage said first named external member from said inner casing, and automatic means adapted to automatically return said inner casing to an extreme position of its range of focal length upon disengagement of said first external member from said inner casing.

CHARLES EDWARD HILLERY-COLLINGS.